UNITED STATES PATENT OFFICE.

JOSEPH H. WOOD, OF AKRON, OHIO.

FLOOR-CLOTH.

SPECIFICATION forming part of Letters Patent No. 259,257, dated June 6, 1882.

Application filed March 2, 1882. (No specimens.)

*To all whom it may concern:*

Be it known that I, JOSEPH H. WOOD, of Akron, in the county of Summit and State of Ohio, have invented a new and useful Improvement in Floor-Cloths, of which the following is a specification.

My invention has relation to that class of floor-covering which, under the general name of "oil-cloth," consists generally of woven fabric coated with paints. The objection to these oil-cloths is that in order to produce requisite thickness coarse fabric is used for the foundation, and the amount of paint necessary to fill and bring this to an even surface renders the whole brittle and liable to crack on being bent or rolled.

The object of my invention is the production of a floor-cloth which shall obviate these difficulties, be soft and pliable, of any desired thickness, elastic under foot, and susceptible of a high degree of finish with a small quantity of paint.

To this end it consists of a layer of paper-board covered on one or both sides with a woven fabric, the latter saturated and finished with paint. The paper-board which I adopt as preferable for this purpose is that made from straw pulp, and known as "straw-board," on account of its cheapness, flexibility, and elasticity; but any paper-board may be used, and may be of any desired thickness. For the woven-fabric covering coarse cotton sheeting will in most cases be found suitable, although any kind of cloth may be used, the nature and quality of which will be determined by the character of the floor-covering desired. This fabric should be caused to thoroughly adhere to the board, and this may be either by pressing it between rolls against the board while the latter is in process of construction, or it may be cemented upon the finished board. The fabric is then saturated with paints usual or suitable for the construction of oil-cloth, and finished in such patterns, colors, and designs as may be desired.

It is apparent that it may be desirable in some instances to apply the fabric and paint to one side only of the board, leaving the other uncovered.

I claim as my invention—

1. A floor-covering consisting of a layer of paper-board covered upon both sides with and adhering to a layer of woven fabric, the latter saturated with and finished in paint, substantially as hereinbefore described.

2. A floor-covering consisting of a layer of paper-board covered upon one side with and adhering to a layer of woven fabric, the latter saturated with and finished in paint, substantially as hereinbefore described.

In testimony that I claim the foregoing I have hereunto set my hand this 17th day of February, A. D. 1882.

JOSEPH H. WOOD.

Witnesses:
    C. P. HUMPHREY,
    DAYTON A. DOYLE.